JOHN J. REINHART & WILLIAM HOUGHTON.
Improvement in Saw Mills.
No. 125,758. Patented April 16, 1872.
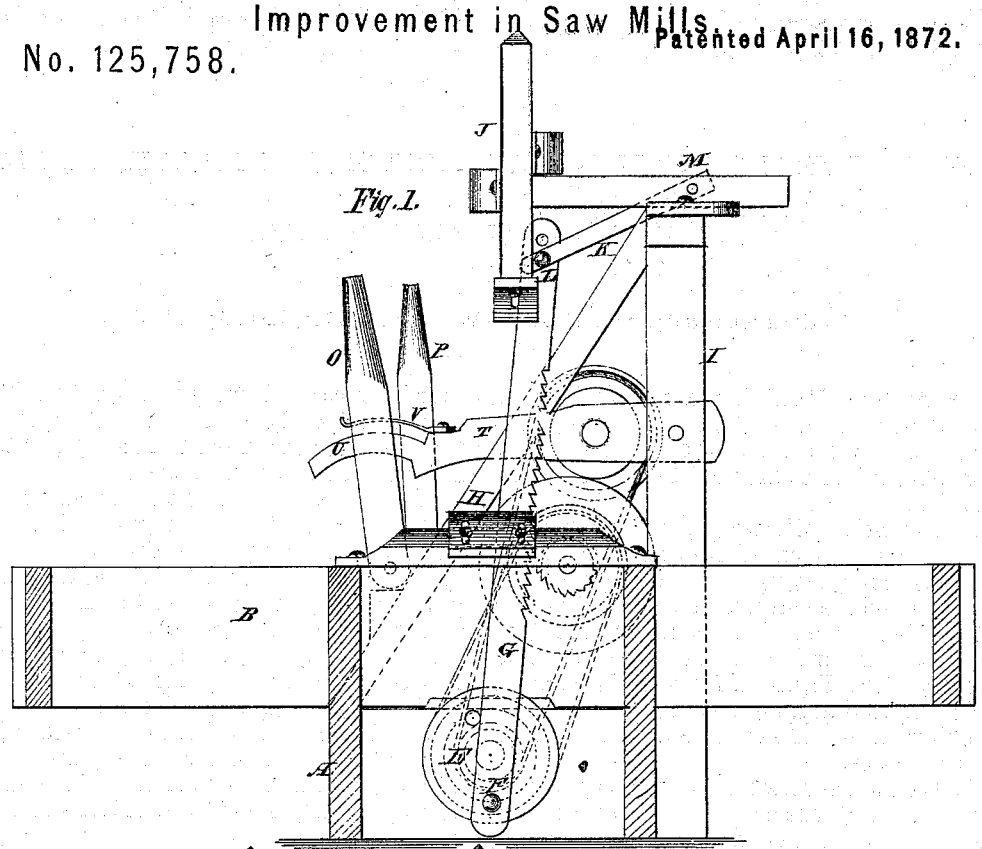

125,758

UNITED STATES PATENT OFFICE.

JOHN J. REINHART AND WILLIAM HOUGHTON, OF LOOGOOTEE, INDIANA.

IMPROVEMENT IN SAW-MILLS.

Specification forming part of Letters Patent No. 125,758, dated April 16, 1872.

Specification describing a new and useful Improvement in Saw-Mills, invented by JOHN J. REINHART and WILLIAM HOUGHTON, of Loogootee, in the county of Martin and State of Indiana.

The invention will first be fully described and then clearly pointed out in the claims.

In the accompanying drawing, Figure 1 represents a side elevation of the mill, shown partly in section, as when looking to the right from the line $xx$ of Fig. 2. Fig. 2 is a sectional front elevation. Fig. 3 is a detail, showing parts of the feed and gigging gearing.

Similar letters of reference indicate corresponding parts.

A is the frame-work on which the operating parts of the mill are supported. B is the carriage-bed. C is the main or driving shaft. D is the driving-pulley. E is the crank-wheel on the inner end of the driving-shaft D, from which the saw receives its motion. F is the crank-pin, to which the saw is rigidly attached by means of iron straps or otherwise. No pitman is employed, but the saw itself partakes of the character or receives the motion of a pitman. G is the saw. H H are the adjustable muley-boards for guiding the saw. I represents the frame-work which supports the feed and gigging gearing of the mill. J is an adjustable frame connected with the frame I, by means of which the upper end of the saw is supported and adjusted. K is a bar or arm, slotted at one end to receive the saw, which is attached to it by a pin, L, as seen in Fig. 1. The other end of the bar is hinged or pivoted, or so connected with the frame J that it allows the opposite end to vibrate with the saw and describe the arc of a circle whose radius is equal to the distance between the center of the pin L and the joint-pin M of the bar K.

As the log is fed up to the saw it will be seen that the saw will make its cut as it descends, and will be carried back in its kerf by the crank, thus preventing the sawdust or fibers of wood from wedging or retarding the upward or back movement of the saw.

I am aware that it is usual to give the muley or upright saw a certain amount of "clearance," but I am not aware that the saw has ever been carried stiffly and rigidly to the pin of the crank-wheel, or that the upper end of the saw has been made to recede from the cut in its upward movement before.

The points of the teeth of the saw are preferably of chisel form, but we do not confine ourselves to any precise shape. The cut of the saw should be at right angles with the grain of the wood, so that the fibers or dust will be as short as possible.

The driving crank-wheel is so constructed that the saw and the parts connected thereto are balanced or nearly balanced.

The frame J, to which the vibrating bar K is hinged, is adjustable on the plate N of the frame I, so that the upper end of the saw can be properly adjusted to the center without difficulty.

O is the feed-lever. P is the gig-lever, the latter being simply to tighten the belt Q for gigging back the carriage.

The lever O throws the wheels R and S into gear. The shaft of the wheel R is boxed in the adjustable bridge-tree T, the end U of which passes through the lever O and is curved, so that, by slipping the lever back and forth on the curved end, the end of the wheel-shaft is raised and lowered, or the wheels are brought into gear for feeding, or are separated, as may be desired. The lever is kept in position on the curve by the spring V, as seen in Fig. 1.

We do not limit or confine ourselves to the precise form or arrangement of any of the parts described, as they may be varied in many ways without departing from our invention.

Having thus described our invention, we claim as new and desire to secure by Letters Patent—

1. The saw G, hung by pin F to the wheel E, and by pin L to a slotted and pivoted bar, K, as and for the purpose described.

2. The curved end U of the bridge-tree T and the spring V, in combination with the lever O, as and for the purposes described.

JOHN J. REINHART.
WILLIAM HOUGHTON.

Witnesses:
ALEXANDER CHAMEL,
L. BROOKS.